Figure 1:
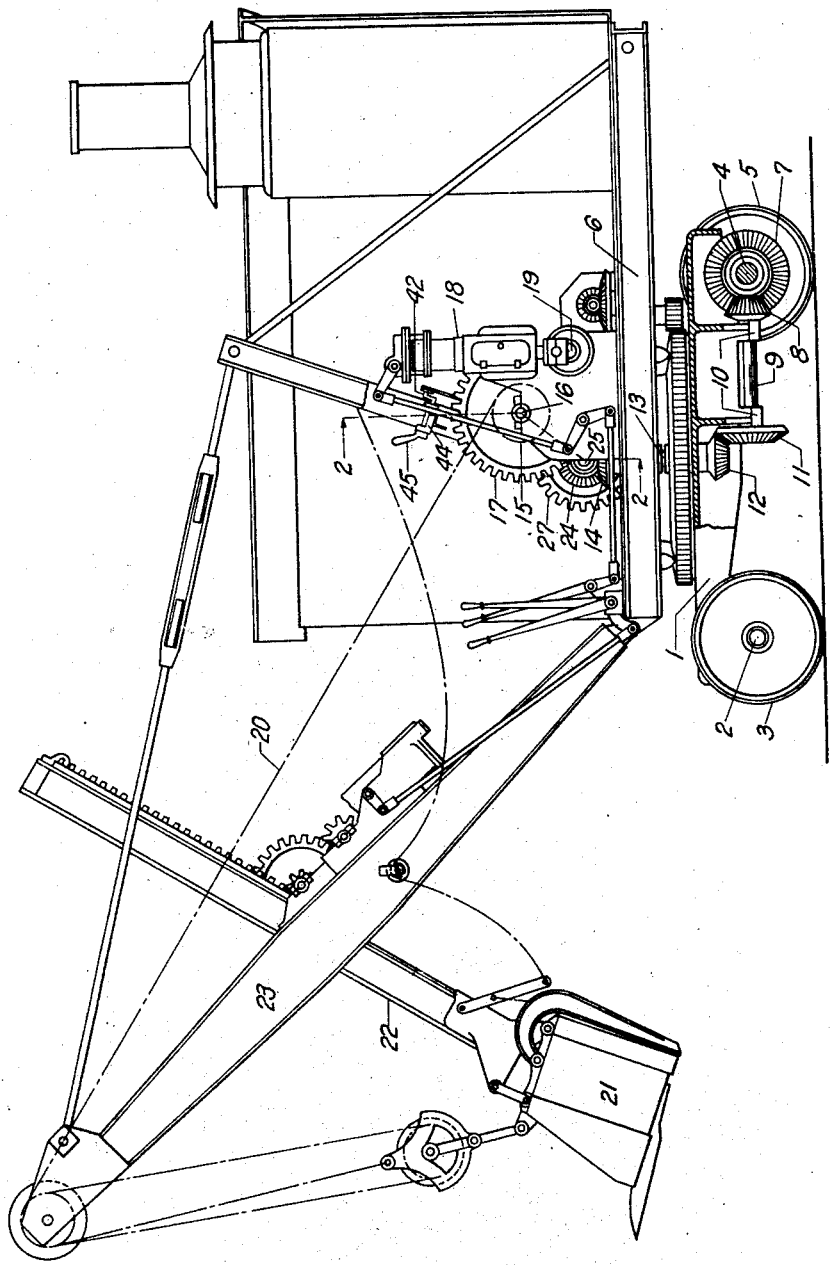

July 20, 1926.

E. J. ARMSTRONG 1,592,842

SPEED CHANGING DEVICE

Filed July 30, 1923  2 Sheets-Sheet 1

Inventor
Edwin J. Armstrong
By W. R. Lord
Attorney

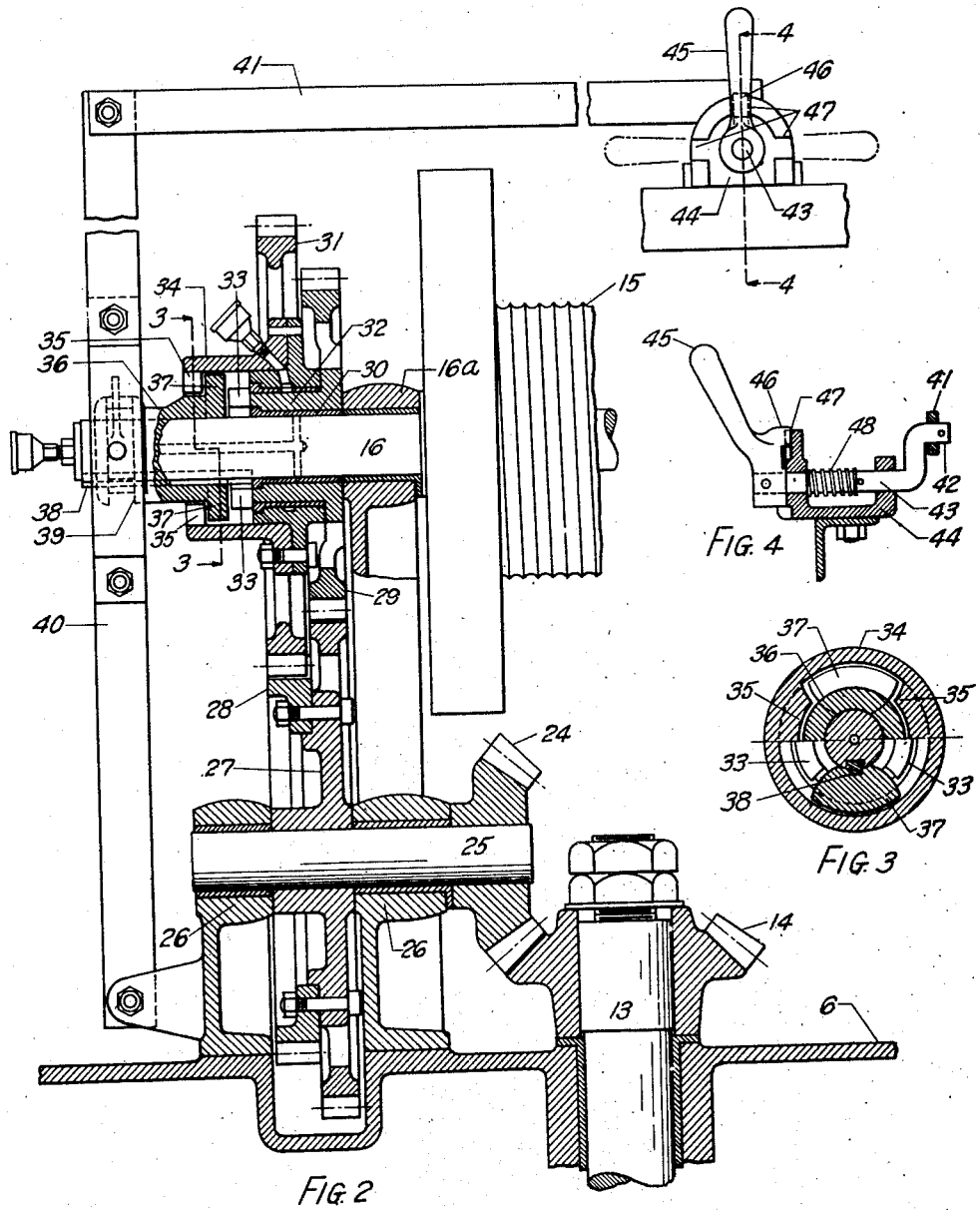

Patented July 20, 1926.

1,592,842

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

SPEED-CHANGING DEVICE.

Application filed July 30, 1923. Serial No. 654,601.

This invention is designed to improve speed changing devices and to simplify the construction thereof. It is particularly adapted for use in connection with power driven excavating machines, or machines having a turn table and is exemplified in the accompanying drawings in this connection. Other features of the invention will appear from the specification and claims.

The invention is illustrated in the accompanying drawings as follows:—

Fig. 1 shows a side elevation of a power shovel with the device in place thereon.

Fig. 2 a section on the line 2—2 in Fig. 1.

Fig. 3 a section on the line 3—3 in Fig 2.

Fig. 4 a section on the line 4—4 in Fig. 2.

1 marks the frame of the machine, 2 the steering axle, 3 the steering wheels 4 the driving axle, 5 the drive wheels, 6 the turn table, 7 a beveled gear on the axle, 8 a beveled gear meshing with the gear 7, 9 a propeller shaft on which the gear 8 is mounted, 10 bearings for the propeller shaft, 11 a beveled gear on the propeller shaft. 12 a pinion meshing with the beveled gear 11, 13 a vertical shaft on which the pinion 12 is mounted, said vertical shaft extending through the frame into the turn table at the axis of the turn table, and 14 a beveled gear on the turn table. These parts are of ordinary construction.

A drum 15 is mounted on the turn table and is mounted on a shaft 16 journaled in bearings 16ᵃ and is driven through a gear 17 mounted on the shaft 16 from an engine 18. A crank shaft 19 of the engine having a gear (not shown) meshing with the gear 17. A dipper 21 is mounted on a dipper stick 22 carried by a boom 23 and a hoisting line 20 runs from the dipper to the drum 15 in the usual manner. In devices of this kind it is usual to utilize the engine and machinery which is ordinarily normally used for operating the dipper or other excavating device for driving the machine as it is moved from one location to another. It is preferable to supply such driving mechanism with speed changing devices and the present speed changing device is particularly applicable to such a use.

A beveled gear 24 meshes with the gear 14. It is fixed on a shaft 25. The shaft 25 is mounted in bearings 26 on the platform. A gear 27 is fixed on the shaft 25 and a gear 28 is mounted on the side of the gear 27, the gear 28 being of a different size than the gear 27. The gear 29 is journaled on a bushing 30 on the shaft 16 and meshes with the gear 27. A gear 31 is journaled on a hub 32 of the gear 29 and meshes with the gear 28. Clutch detents 33 are arranged at the ends of the hub. A hub 34 of the gear 31 extends as a sleeve outwardly over the shaft 16 and is provided with the inwardly extending detents 35 at its outer end, these detents forming gear clutch members. A clutch member 36 is slidingly mounted on the shaft 16 and provided with detents 37 which are adapted to engage either the detents 33 or detents 35 as the sliding member is moved inwardly or outwardly. The detents 33 and 35 are so spaced apart as to permit the neutral position of the detents 37 between them. The clutch member 36 is locked against rotation on the shaft by a spline 38.

It is provided with a grooved shoulder 39 which is engaged by a lever 40. The lever 40 is connected by a link 41 with a crank 42. The crank 42 is formed on a shaft 43. This shaft is journaled in a bracket 44 mounted on the frame. The shaft is provided with a handle 45 to adapt it to be manually operated. A catch finger 46 is arranged on the handle and this is adapted to be brought into detents 47 on the bracket 44 to lock the handle in the three adjustments, upright locking the sliding clutch member in its neutral position, and the two horizontal positions locking it in engagement with the detents 35 and 33. A spring 48 is arranged on the shaft 43 and yieldingly holds the finger 46 in the detents so as to lock the parts in adjustment.

It will readily be seen that by locking the shaft 16 with one or the other of the gears 29, or 31, the shaft 25 will be driven by the gear 27 or 28 and inasmuch as the ratio through these gears is different a different speed will be given to the shaft 25 and through the chain of gears described to the driving axle.

What I claim as new is:—

1. In a speed changing device, the combination, of a shaft; a first gear journaled on said shaft; a second gear of a size differing from the first gear journaled on the first gear; gear clutch members on said gears and spaced axially; a sliding clutch member locked against rotation on the shaft and having a neutral position between said gear clutch members and movable in one direction into engagement with one gear clutch member and in the opposite direction into engagement with the other gear clutch member; manually operable devices for shifting the sliding clutch member; means locking said devices to lock the clutch member in adjustment comprising a rock shaft; a crank on the rock shaft giving motion to the sliding clutch member; a handle on the rock shaft; detents locking with the handle to lock it in different positions; a spring yieldingly holding the detents in engagement; and gears meshing with the first and second gears.

2. In a speed changing device, the combination of a shaft; a first gear journaled on said shaft; a second gear of a size differing from the first gear journaled on the first gear; gear clutch members on said gears and spaced axially; a sliding clutch member locked against rotation on the shaft and having a neutral position between said gear clutch members and movable in one direction into engagement with one gear clutch member and in the opposite direction into engagement with the other gear clutch member; manually operable devices for shifting the sliding clutch member; means locking said devices to lock the clutch member in adjustment comprising a rock shaft; a crank on the rock shaft giving motion to the sliding clutch member; a handle on the rock shaft; detents locking with the handle to lock it in different positions; a spring yieldingly holding the detents in engagement, said spring being mounted on the rock shaft; and gears meshing with the first and second gears.

3. In a speed changing device, for excavators, the combination of a frame; a driving axle on the frame; a turn table on the frame; a vertical shaft at the axis of the turn table; means communicating the movement of the vertical shaft to the axle; a beveled gear on the vertical shaft; a beveled gear meshing with said first-mentioned beveled gear; an auxiliary shaft on which said second beveled gear is mounted; two gears mounted on the auxiliary shaft and fixed to rotate therewith, said gears differing in size; a drum; a shaft on which the drum is mounted; a first gear journaled on said drum shaft and meshing with one of the gears on the auxiliary shaft; a second gear journaled on said first gear and meshing with the other of the gears on the auxiliary shaft; clutch members on said first and second gears spaced axially; a sliding clutch member mounted on the drum shaft and arranged to have a neutral position between the first and second gear clutch members and to be movable into engagement therewith by sliding on said shaft; means for locking said sliding clutch member on the shaft; and means for actuating the same.

In testimony whereof I have hereunto set my hand.

EDWIN J. ARMSTRONG.